(No Model.) 2 Sheets—Sheet 1.

W. A. GILDAY & T. M. HECKMAN.
GRIP OR CLUTCH TO BE USED ON ENDLESS CABLE WAYS.

No. 289,527. Patented Dec. 4, 1883.

Witnesses
John F. Belstaling
James E. Hammer.

Inventor
William A. Gilday
Thomas M. Heckman
by their attorney
Thomas D. Mowlds (No Model.) 2 Sheets—Sheet 2.

W. A. GILDAY & T. M. HECKMAN.
GRIP OR CLUTCH TO BE USED ON ENDLESS CABLE WAYS.

No. 289,527. Patented Dec. 4, 1883.

Witnesses
John F. Belsterling
James E. Hammer

Inventor
William A. Gilday
and
Thomas M. Heckman
by their Attorney
Thomas D. Mowlds

UNITED STATES PATENT OFFICE.

WILLIAM A. GILDAY AND THOMAS M. HECKMAN, OF PHILADELPHIA, PA.

GRIP OR CLUTCH TO BE USED ON ENDLESS-CABLE WAYS.

SPECIFICATION forming part of Letters Patent No. 289,527, dated December 4, 1883.

Application filed September 7, 1883. (No model.)

*To all whom it may concern:*

Be it known that we, WILLIAM A. GILDAY and THOMAS M. HECKMAN, citizens of the United States, residing at Philadelphia, in the county of Philadelphia and State of Pennsylvania, have invented certain new and useful Improvements in Grips or Clutches to be used on Endless-Cable Ways, of which the following is a specification, reference being had therein to the accompanying drawings.

Our invention relates to grips or clutches to be used on endless-cable ways; and the improvements consist in the manner of constructing said grip and the means whereby it is operated, as will be hereinafter described, and more particularly pointed out in the claims.

Figure 1:
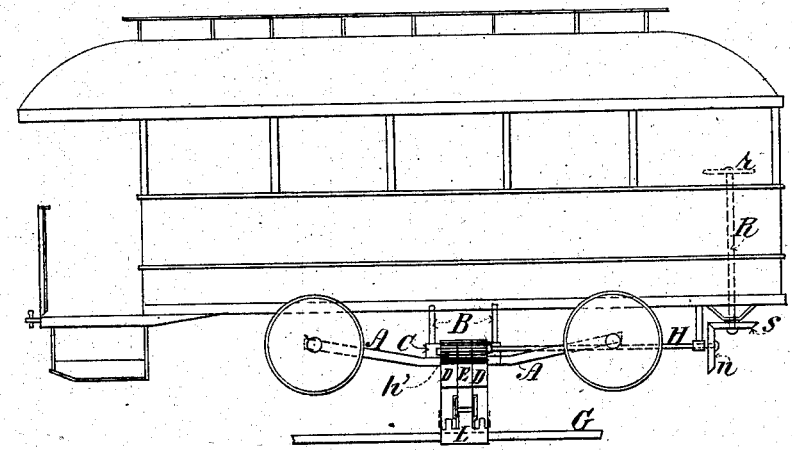
Figure 2:
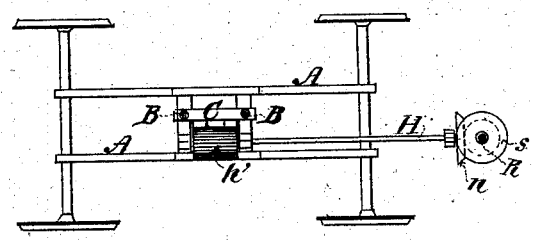
Figure 3:
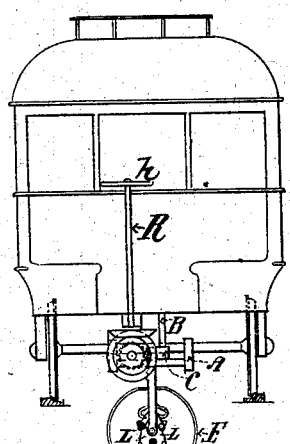
Figure 4:
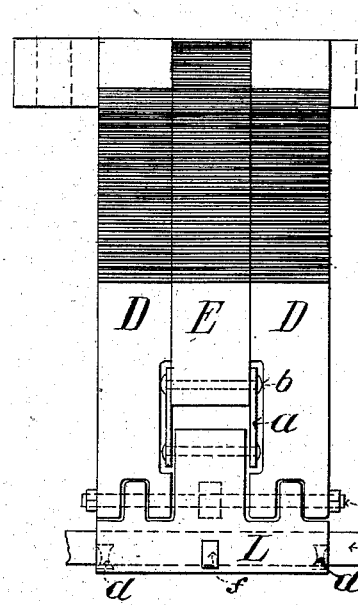
Figure 5:
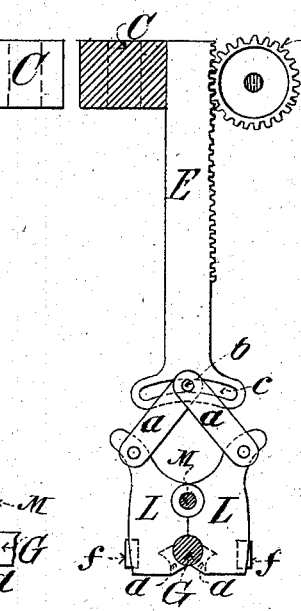
Figure 6:
Figure 7:
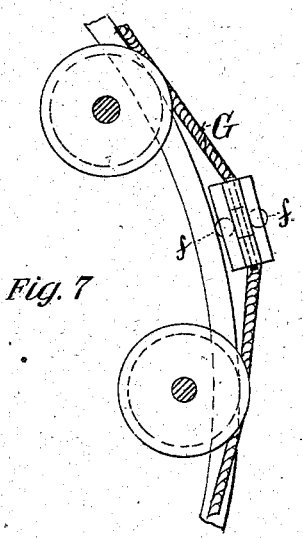
Figure 8:
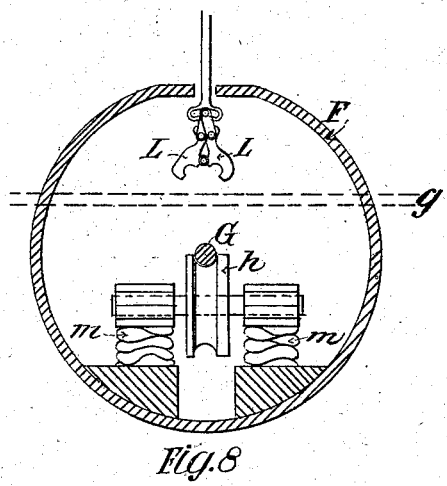

In the accompanying drawings, Figure 1 represents a side elevation of a car having our improvements attached thereto. Fig. 2 is a plan with the car-body removed. Fig. 3 is an end elevation. Fig. 4 is a side view of the gripping device and connecting mechanism. Fig. 5 is a part cross-section and part end view of the grip and connections. Fig. 6 is one of the bars that support the grip and hold it in position. (See Fig. 4.) Fig. 7 shows the grip in position on the cable when passing around a curve in the track. Fig. 8 shows a section of the tube containing the cable with the grip raised, so as to allow it to pass over another cable, represented by the dotted lines and running at right angles to the first one.

A A is the frame-work supporting the grip and its connections. This frame is held in position by bearings on the axle at either side of the car.

B B are guides, upon which the whole gripping device is moved or worked up and down.

C is a cross-head, which slides upon the guides B B.

D D are two bars fastened at their upper ends to the cross-head C, and joined at their lower ends to the gripping device proper.

E is a central pressure-bar operating the grip. The faces of the bars D D and pressure-bar E are all provided with cogs, those on the pressure-bar E extending some distance above and beyond the cogs on the bars D D, as shown in Fig. 4.

L L are the two parts of the grip.

*a a* are two bars or levers connecting the grip to the pressure-bar E.

M is a bolt connecting the two parts of the grip and securing them to the supporting-bars D D.

*b* is a bolt passing through the slot *c*, and joining the bars *a a* to the pressure-bar E.

*d d* are small rollers on either side and at both ends of the grip. These rollers are set in, so that when the grip is tightened they do not interfere with it, and when the grip is loosened slightly the cable will roll smoothly thereon, the object being to avoid the cutting or wear of the cable when sliding through the grip.

*f f* are two other small rollers on the outside of the grip, to facilitate the passage of the grip around a curve, as shown in Fig. 7.

F is the tube inclosing the cable; G, the cable; *g*, a second cable running at right angles to the first.

On the bottom of the tube F are placed a sufficient number of the rollers *h* to properly support and carry the cable G.

*m m* are spiral springs supporting the bearings of the rollers *h*. By the use of these spiral springs the rollers *h* are held in the proper position to support the cable, and at the same time the progress of the grip is not interfered with, as the springs will allow the bearings to be forced down by the grip when passing over.

R is a vertical shaft extending upward from the under side of the bottom of the car. The upper end of this shaft is provided with the hand-wheel *r*. To the lower end is secured the beveled cog-wheel *s*.

H is a shaft extending under the bottom of the car, as shown in Figs. 1 and 2.

*n* is a beveled cog-wheel on one end of the shaft H, and gearing into the wheel *s*.

*h'* is a cog-wheel on the other end of the shaft H. This cog-wheel gears into the cogs on the face of the pressure-bar E and bars D D.

The grip being in the position shown in Fig. 8, the method of operating is as follows, viz: The hand-wheel *r* on the shaft R being turned in the required direction, moves the beveled cog-wheel *s*, which operates the beveled-gear wheel *n*, thus conveying the motion to the horizontal shaft H, and revolving the wheel $h'$, which in turn operates on the cogs on the pressure-bar E and bars D D, lowering them until the gripping device is brought in contact with the cable. Then, as the cog-wheel $h'$ has passed over all of the cogs on the bars D D, a continued movement will force the pressure-bars E still farther and cause the grip L L to tightly grasp the cable, as shown in Figs. 4 and 5. The slot $c$ in the pressure-bar E allows of a lateral movement, and prevents a strain when passing around curves, and the increased number of cogs on the said pressure-bar gives it an independent movement only sufficient to open and close the grip. To raise the grip so that it can pass over another cable, or to take it out entirely, (the proper openings in the tube being provided,) it is only necessary to continue turning the hand-wheel $r$.

Having thus described our invention, what we claim as new, and desire to secure by Letters Patent of the United States, is—

1. In a clutch for endless-cable ways, the combination of the jaws L L, pivoted together at a point between the lower and upper ends, with the levers $a\ a$, pivoted to the jaws above the point where they are joined together, the pressure-bar E, and suitable means for operating the same, whereby the spreading of the top of the jaws causes them to pinch at their lower ends, as set forth.

2. In a clutch for endless-cable ways, the jaws L L, bars D D, and pressure-bar E, in combination with the wheel $h'$, simultaneously operating the bars D D and E, substantially as shown and described.

3. The jaws L L, connected with the pressure-bar E, in combination with the bars D D, guides B B, and cross-head C, substantially as described.

4. In a cable-grip, the combination of the centrally-pivoted jaws L L, levers $a\ a$, operated to spread the tops of the jaws, and thereby cause them to pinch at the bottom, means for operating the jaws, the cable G, and rollers $d\ d$, in the base of jaws, for contact with the cable, as set forth.

5. In a cable-grip, the combination, with the pivoted jaws and means for operating them, of the rollers $d\ d$, for contact with the cable, and rollers $f\ f$, on the exterior thereof, for contact with the sides of the tunnel, as set forth.

6. The tube F and rollers $h$, having the bearings supported by the springs $m\ m$, in combination with the gripping device of an endless-cable way, substantially as shown and described.

In testimony whereof we affix our signatures in presence of two witnesses.

WILLIAM A. GILDAY.
THOMAS M. HECKMAN.

Witnesses:
T. J. PORTER,
R. T. FRAILEY.